(12) United States Patent
Vimpari

(10) Patent No.: US 7,065,876 B2
(45) Date of Patent: Jun. 27, 2006

(54) EXTRA-ROLL SLIDE BEARING SYSTEM FOR A PAPER/BOARD MACHINE OR A FINISHING MACHINE

(75) Inventor: Juha Vimpari, Muurame (FI)

(73) Assignee: Metso Paper, Inc., Helsinki (FI)

( * ) Notice: Subject to any disclaimer, the term of this patent is extended or adjusted under 35 U.S.C. 154(b) by 22 days.

(21) Appl. No.: 10/883,222

(22) Filed: Jul. 1, 2004

(65) Prior Publication Data
US 2004/0237306 A1 Dec. 2, 2004

Related U.S. Application Data

(62) Division of application No. 09/993,462, filed on Nov. 14, 2001, now Pat. No. 6,776,530.

(30) Foreign Application Priority Data
Nov. 14, 2000 (FI) ................................. 20002487

(51) Int. Cl.
*B21K 1/10* (2006.01)
*B21D 53/10* (2006.01)
(52) U.S. Cl. .................. 29/898.02; 29/898.07
(58) Field of Classification Search ............ 29/898.02, 29/898.07; 384/99, 100, 114, 117, 309, 311, 384/312
See application file for complete search history.

(56) References Cited
U.S. PATENT DOCUMENTS
3,746,328 A * 7/1973 Martt ........................... 266/78

5,073,036 A * 12/1991 Sutton et al. ............... 384/107
6,776,530 B1 * 8/2004 Vimpari ...................... 384/117

FOREIGN PATENT DOCUMENTS
DE 29910075 9/1999
WO 9836184 8/1998

* cited by examiner

*Primary Examiner*—Eric Compton
(74) *Attorney, Agent, or Firm*—Wolf Block Schorr & Solis-Cohen LLP

(57) ABSTRACT

The invention relates to an extra-roll slide bearing system (20) for a paper/board machine or a finishing machine, surrounding a shaft (2) in a roll (1). The bearing system comprises a body section (5), which is formed with a bearing housing (7) provided with hydrostatic bearing elements (3, 3A) disposed around the shaft (2). The bearing elements are fitted with slide elements (4, 4A), having a sliding surface (16) directed towards the shaft (2). Between the slide elements (4) and the shaft (2) is a bushing (6), which is mounted on the shaft (2) for rotation therewith, said slide elements (4, 4A) being adapted to position themselves around the bushing (6) with the sliding surfaces (16) against the external surface of the bushing directed away from the shaft for supporting said shaft (2), and hence the roll (1), rotatably relative to the body section (5). The bearing housing (7) has its axial ends provided with end caps (8, 9), along with packing elements (12, 14) therefor, for sealing the bearing housing. The slide bearing system (20) of the invention is assembled for a single package, which is mountable on the shaft (2) and dismountable from the shaft (2) as a single package.

4 Claims, 5 Drawing Sheets

EXTRA-ROLL SLIDE BEARING SYSTEM FOR A PAPER/BOARD MACHINE OR A FINISHING MACHINE

This application is Divisional of U.S. application Ser. No. 09/993,462, filed on Nov. 14, 2001 and issued as U.S. Pat. No. 6,776,530.

FIELD OF THE INVENTION

The present invention relates to a slide bearing system surrounding a shaft in a roll for a paper/board machine or a finishing machine, comprising a body section which is formed with a bearing housing, said bearing housing being provided with hydrostatic bearing elements disposed around the shaft and fitted with slide elements, having a sliding surface directed towards the shaft, a bushing between the slide elements and the shaft, which is mounted on the shaft for rotation therewith, said slide elements being adapted to position themselves around the bushing with the sliding surfaces against the external surface of the bushing directed away from the shaft for supporting said shaft, and hence the roll, rotatably relative to the body section, and end caps, along with packing elements therefor, mounted on the axial ends of the bearing housing for sealing the bearing housing. The present invention relates further to a method for slide bearing a roll in a paper/board machine or a finishing machine, by means of an extra-roll slide bearing system.

BACKGROUND OF THE INVENTION

This type of external slide bearing system or assembly can be used in connection with a variety of rolls, such as thermol rolls, center rolls, sizer rolls, felt rolls, etc. FI Patent application 970624 discloses an extra-roll slide bearing arrangement, wherein the slide elements of hydrostatic bearing elements mounted around a shaft are adapted to position themselves around a neck of the roll shaft for supporting the shaft, and hence the roll, rotatably relative to a bearing block. This type of prior art arrangement is depicted schematically in FIG. 1. The prior art solution shown in FIG. 1 comprises bearing elements, which are mounted on a bearing block 5 and capable of positioning themselves freely around a shaft 2 in a nip roll 1. Said nip is established together with a counter roll 1A. Reference numeral 3A represents a main load-carrying bearing and reference numeral 3 represents an abutment bearing. Reference numeral 3B indicates side bearings. Reference numerals 4A, 4 and 4B represent slide elements for bearing elements, respectively. As a result of the conicity of the shaft 2, the bearing elements are positioned to be slightly inclined relative to the rotation axis of the shaft 2, which has required certain special arrangements regarding the bearing block 5. The present Applicant's earlier Finnish patent 104343 discloses a solution, in which a bushing is fitted between a slide element 4 and a shaft 2, having an external surface substantially cylindrical in cross-section. By virtue of this, the bearing elements can be disposed around the shaft 2 perpendicularly relative to its rotation axis.

The assembly and installation of such prior art slide bearings is demanding and involves a multitude of components in the process of fitting a roll with bearings. In addition, these prior art slide bearing systems must be assembled and tested with a roll or a separate test bushing. Moreover, the replacement of such a bearing assembly is a tedious process, and typically the entire roll is replaced by another roll outfitted with a standby bearing assembly. Furthermore, in solutions, wherein sliding surfaces are in a direct contact with a roll shaft, a sliding surface damage means that the roll will be damaged as well.

Consequently, it is one essential object of the present invention to provide an improved extra-roll slide bearing system, whereby the above drawbacks can be eliminated.

In order to achieve this object, a slide bearing system of the invention is characterized in that the slide bearing system is assembled for a single package, which is mountable on a shaft and dismountable from a shaft as a single package. A method according to a first aspect of the invention for slide bearing a roll in a paper/board machine or a finishing machine by means of an extra-roll slide bearing system is characterized in that the slide bearing system is assembled for a single package directly on a shaft. On the other hand, a method according to a second aspect of the invention is characterized in that the slide bearing system is assembled for a single package and mounted as a single package on a shaft.

One of the benefits offered by the present invention is that the entire slide bearing system is assembled for a single package, which is readily and quickly mountable on a shaft and dismountable from a shaft and which includes fewer components than the currently available bearing system. In addition, the assembly and testing of a bearing system can be implemented without a roll body and the roll can be replaced without a standby or substitute bearing system. Furthermore, the bushing included in the bearing system can be used as a fitting sleeve for old roll bodies. Still another advantage gained by the invention is an improved repairability in the events of bearing damage.

The invention will now be described in more detail with reference made to the accompanying drawings, in which:

DETAILED DESCRIPTION OF THE INVENTION

Figure 1:
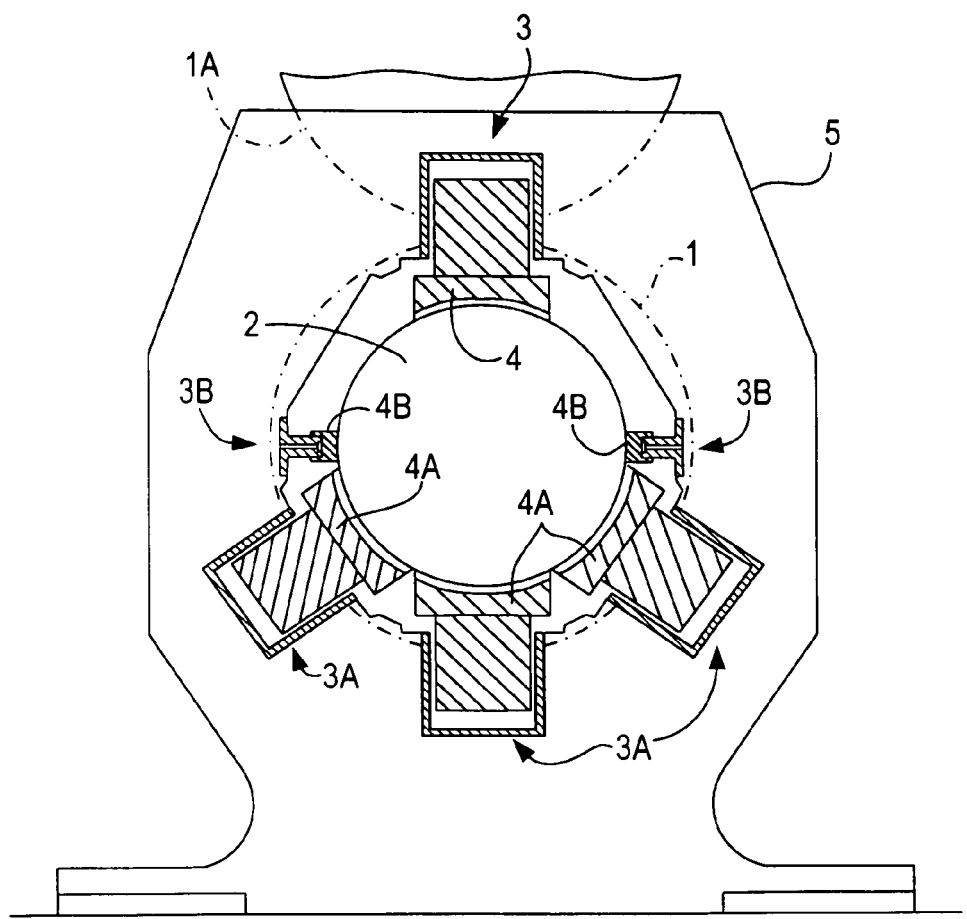
FIG. 1 shows schematically, in a partially cut-away end view, a slide bearing system of the prior art.
Figure 2:
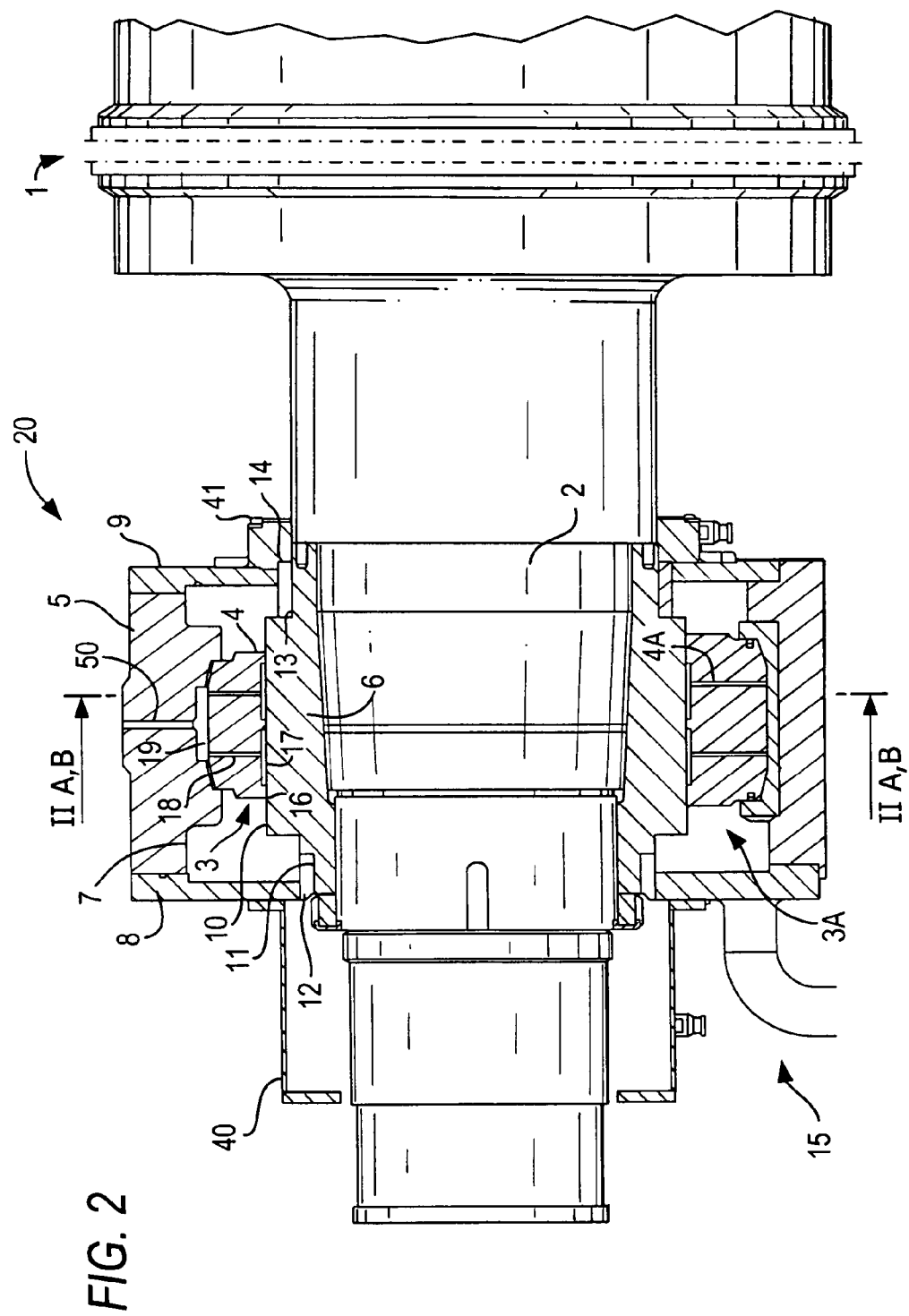
FIG. 2 shows schematically, in a sectional side view, a slide bearing system according to one embodiment of the invention at the service-side end of a roll.
Figure 2A:
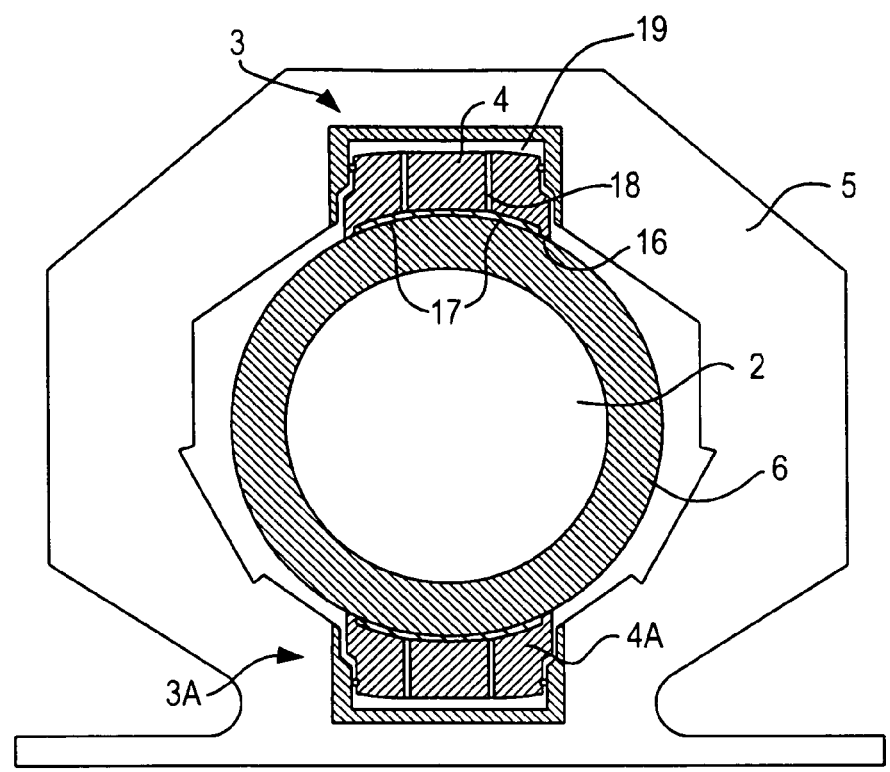
Figure 2B:
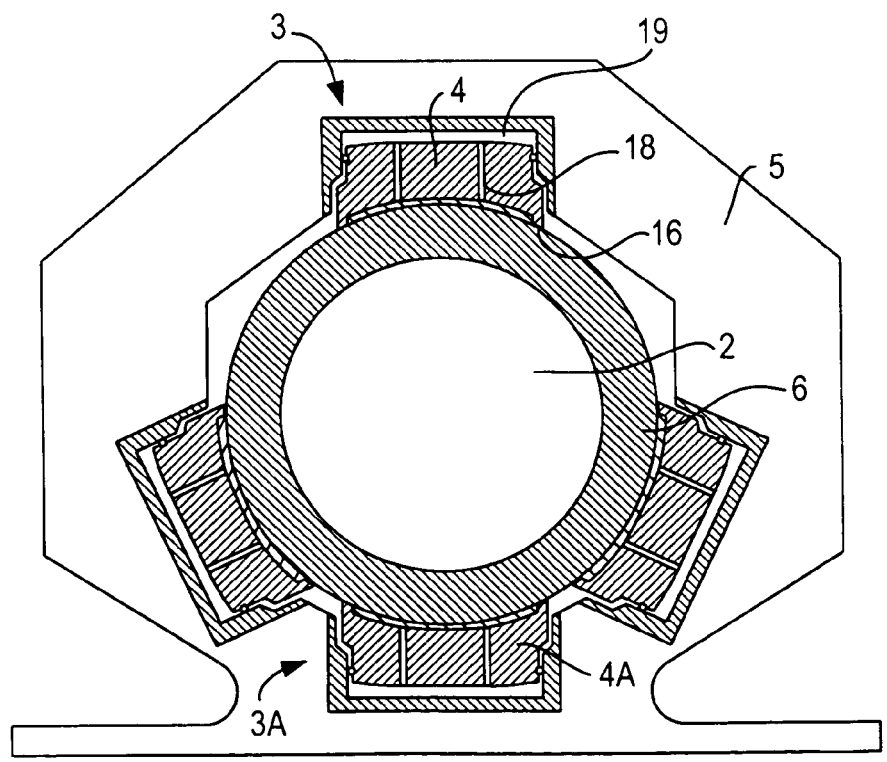
Figure 3:
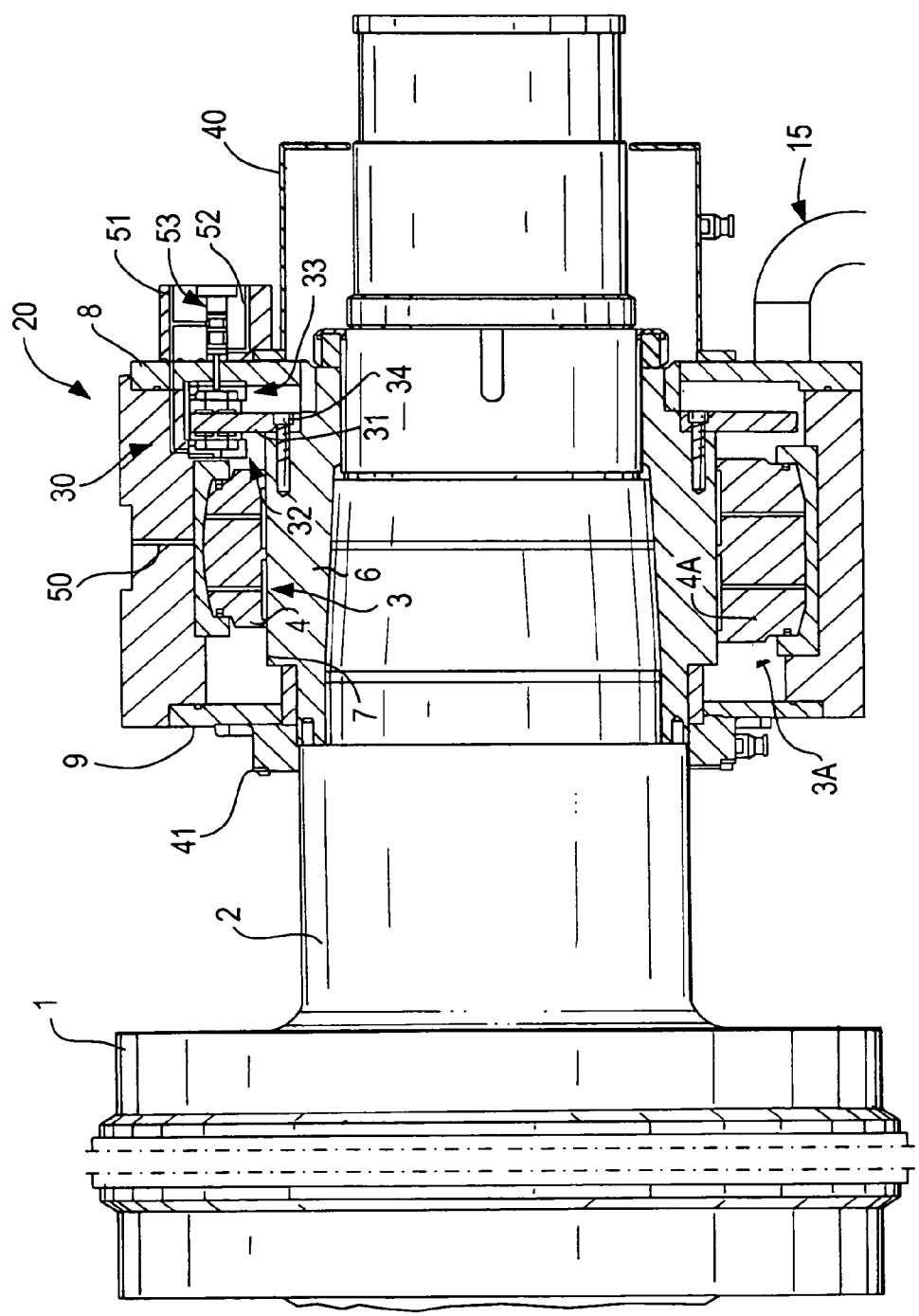
FIG. 3 shows the solution of FIG. 2 mounted on the driving end of a roll.
Figure 4:
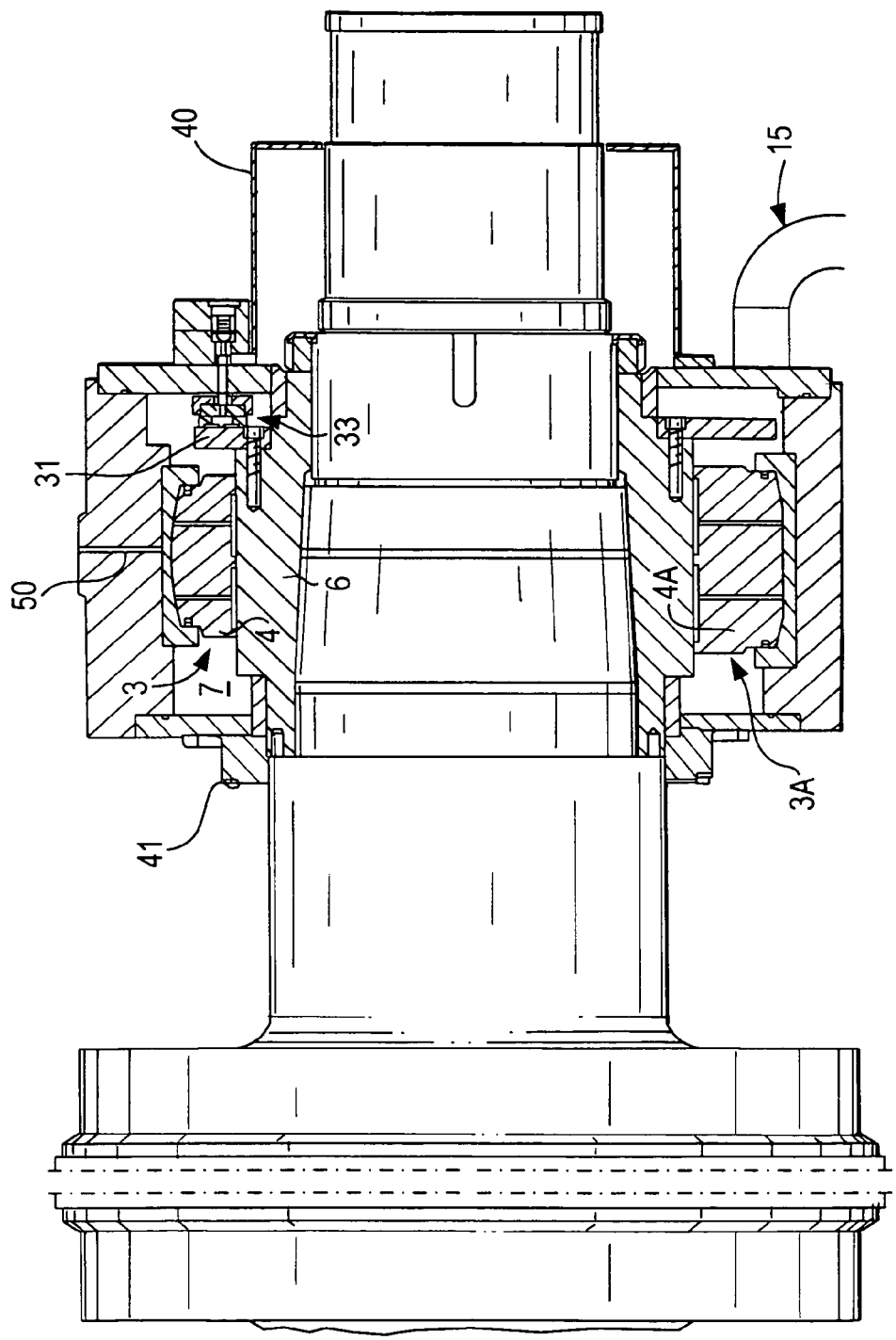
FIG. 4 shows a second embodiment of the invention in view similar to FIG. 2.

A roll is represented by reference numeral 1 and its shaft by reference numeral 2. FIG. 2 depicts an extra-roll slide bearing system 20 of the invention, comprising a body section 5, which constitutes an outer shell for a slide bearing package and which is formed with a bearing housing 7 for accommodating bearing elements 3, 3A to surround the roll shaft 2. As shown in FIG. 1, the bearing elements usually include a main bearing element 3A acting in a principal loading direction, and an abutment bearing 3 on the side of the shaft opposite thereto, and additionally side bearings 3B acting in a direction transverse to the principal loading direction between the main bearing and the abutment bearing. In FIG. 1, the main bearing 3A is divided in three components, whereof the central bearing element is essentially in alignment with the abutment bearing element 3 in a principal loading plane, and on either side thereof are disposed the other bearing elements 3A of the main bearing, mounted symmetrically at an angle with respect to the principal loading direction. The side bearings are represented in FIG. 1 by reference numeral 3B, and the slide elements thereof by reference numeral 4B, respectively. In FIGS. 2–4, respectively, the main bearing is represented by reference numeral 3A and its abutment bearing by reference numeral 3. The main bearing may also comprise just one bearing element 3A, or the main bearing may comprise also in axial direction two or more successive bearing elements.

The slide bearing system 20 shown in FIG. 2 and mounted on the service end of a roll comprises additionally a slide bushing 6 adapted around the shaft 2, having its outer surface 10 made substantially cylindrical and said outer surface providing a support for sliding surfaces 16 of slide elements 4, 4A of the bearing elements. The sliding surface 16 is provided with lubricating oil pockets 17, which are supplied with oil through capillary bores 18 from a pressure chamber 19 of the appropriate bearing element 3, 3A. The pressure chambers 19 are supplied with oil through an oil inlet 50 from an oil supply (not shown). Each bearing element 3, 3A can be provided with an individual oil feed, or the oil feed can be implemented also through a single fitting, the distribution of oil to various bearing elements being effected by means of intra-bearing flow regulators, such as pipeworks. The slide bearing system 20 further comprises end caps 8 and 9, mounted on the axial ends of the bearing housing 7 for sealing the bearing housing. The end caps 8 and 9 are provided with packing elements 12 and 14, respectively. For the purpose of packing, the bushing 6 has its outer surface 10 formed in its axial end regions with recesses, which constitute mating surfaces 11 and 13, respectively, for placing the packing elements 12 and 14 against the same. This provision of the mating or packing surfaces 11 and 13 in the outer surface of the bushing 6 enables an improved control for the outer surface section of a bushing lying against the slide elements' sliding, surface 16 and for the packing surfaces in terms of concentricity, which in turn improves the packing in terms of its service life. In the above-cited FI patent 104343, the packing surfaces are made directly on the shaft 2.

In the inventive slide bearing system, the packing surfaces 11 and 13 provided on the bushing 6 are preferably black-nitrated. Reference numerals 40 and 41 represent external guard elements for collecting the oil possibly seeped from the bearing system. Reference numeral 15 represents an oil discharge fitting.

FIG. 3 illustrates the embodiment of FIG. 2 as mounted on the driving end of a roll. The only difference between FIG. 3 and FIG. 2 has to do with elements required by axial bearing assembly.

In the embodiment shown in FIGS. 2 and 3, the axial bearing system is only mounted on the driving end and it comprises an abutment ring 31, which is secured, e.g. by means of bolts 34, to the bushing element 6 and on either side of which are disposed bearing elements 32 and 33 of an axial bearing system 30 supplied with hydraulic oil through passages 51, 52. Reference numeral 53 represents a control valve for the axial bearing system, which passes the pressure of a hydraulic fluid to the bearing elements 32, 33. The bearing elements 32, 33 positioned on either side of the abutment rings 31 enable the axial bearing system to be mounted on just one end of a roll. The bearing housing 7 can be made symmetrical at each end of a roll by reserving therein a space required by the axial bearing system.

The only difference between the embodiment of FIG. 4 and that of FIGS. 2 and 3 is that the axial bearing system 30 is mounted on both the service end and the driving end of a roll, the bearing element 33 being positioned outside the abutment ring 30 secured to the bushing 6, as viewed from the roll 1. The advantage gained by this arrangement of FIG. 4 over that of FIGS. 2 and 3 is that the assembled slide bearing system 20, along with its axial bearing system, becomes absolutely symmetrical at each end of a roll.

In a method according to a first aspect of the invention, the slide bearing system 20 can be assembled first on a roll shaft by placing the roll shaft in the central region of the bearing housing 7 established in a bearing block, and by mounting the slide bushing 6 over the shaft and by then fitting the slide elements 4, 4A of the bearing elements 3, 3A in place in the bearing housing 7, and by then securing the end caps 8, 9, along with the packing elements thereof, to the bearing block 5. When a replacement is called for, the entire slide bearing system, along with its bearing block, can thus be dismounted from the shaft as a single package, and another slide bearing package can then be mounted in place around the shaft.

In a method according to a second aspect of the invention, the slide bearing system can be originally assembled for a ready-to-use package and mounted as a complete package on a roll shaft even at the time of a first installation. Such a slide bearing system assembled for a ready-to-use package can also be tested as a separate package prior to mounting the same on a shaft.

The invention claimed is:

1. A method for slide bearing a roll in a paper/board machine or a finishing machine, providing an extra-roll slide bearing system, said slide bearing system comprising a body section (5) which is formed with a bearing housing (7), said bearing housing being provided with hydrostatic bearing elements (3) disposed around a shaft (2) and fitted with slide elements (4), having a sliding surface (16) directed towards the shaft (2), a bushing (6) between the slide elements (4) and the shaft (2), which is mounted on the shaft (2) for rotation therewith, said slide elements (4, 4A) being adapted to position themselves around bushing (6) with the sliding surfaces (16) against the bushing's outer surface directed away from the shaft for supporting said shaft (2), and hence a roll (1), rotably relative to the body section (5), and end caps (8, 9), along with packing elements (12, 14) therefor, mounted on the axial ends of the bearing housing (7) for sealing the bearing housing, and assembling the slide bearing as a single package directly on the shaft.

2. A method as set forth in claim 1, wherein the slide bearing system (20) is dismounted from the shaft (2) as a single package.

3. A method for slide bearing a roll in a paper/board machine or a finishing machine, providing an extra-roll slide bearing system, said slide bearing system comprising a body section (5) which is formed with a bearing housing (7), said bearing housing being provided with hydrostatic bearing elements (3, 3A) disposed around a shaft (2) and fitted with slide elements (4, 4A), having a sliding surface (16) directed towards the shaft (2), a bushing (6) between the slide elements (4) and the shaft (2), which is mounted on the shaft (2) for rotation therewith, said slide elements (4) being adapted to position themselves around the bushing (6) with the sliding surfaces (16) against the bushing's outer roll (1), rotably relative to the body section (5), and end caps (8, 9), along with packing elements (12, 14) therefor, mounted on the axial ends of the bearing housing (7) for sealing the bearing housing, and assembling and mounting the slide bearing system as a single package on the shaft.

4. A method as set forth in claim 3, wherein the slide bearing system (20) is tested as a single package prior to mounting the same on the shaft (2).

* * * * *